United States Patent
Daughters

(10) Patent No.: US 11,131,415 B2
(45) Date of Patent: Sep. 28, 2021

(54) PIPE FITTING

(71) Applicant: Dana L. Daughters, Geneva, OH (US)

(72) Inventor: Dana L. Daughters, Geneva, OH (US)

(73) Assignee: GAMECHANGER FITTINGS, LLC, Geneva, OH (US)

( * ) Notice: Subject to any disclaimer, the term of this patent is extended or adjusted under 35 U.S.C. 154(b) by 355 days.

(21) Appl. No.: 15/180,433

(22) Filed: Jun. 13, 2016

(65) Prior Publication Data
US 2016/0363248 A1    Dec. 15, 2016

Related U.S. Application Data

(60) Provisional application No. 62/174,033, filed on Jun. 11, 2015.

(51) Int. Cl.
| | |
|---|---|
| *E03C 1/182* | (2006.01) |
| *F16L 41/02* | (2006.01) |
| *F16L 45/00* | (2006.01) |

(52) U.S. Cl.
CPC ............ *F16L 41/023* (2013.01); *E03C 1/182* (2013.01); *F16L 41/021* (2013.01); *F16L 45/00* (2013.01)

(58) Field of Classification Search
CPC ....... F16L 41/004; F16L 41/023; F16L 45/00; F16L 41/021; E03C 1/182
USPC .............. 285/132.1, 56, 141.1, 142.1, 139.1; 405/286, 36, 125; 52/220.8
See application file for complete search history.

(56) References Cited

U.S. PATENT DOCUMENTS

| | | | | |
|---|---|---|---|---|
| RE3,062 E | * | 8/1868 | McLeod | F16L 41/023 285/132.1 |
| D28,572 S | | 5/1898 | Rose | |
| 607,983 A | * | 7/1898 | Cooper | E03C 1/284 137/216.1 |
| D29,983 S | | 1/1899 | Byrnes | |
| D31,553 S | | 9/1899 | Glauber | |
| D33,224 S | | 9/1900 | Thompson | |
| 675,090 A | * | 5/1901 | Fruin et al. | E03C 1/122 285/132.1 |
| 712,759 A | * | 11/1902 | Breen | F16K 13/04 137/68.19 |
| 794,165 A | * | 7/1905 | Dozier et al. | F16L 41/023 285/126.1 |
| 810,047 A | * | 1/1906 | Fruin | E03C 1/122 285/132.1 |
| 918,137 A | * | 4/1909 | Fleming | F15B 13/0857 137/560 |
| 954,852 A | * | 4/1910 | Colombo | H02G 3/06 285/179.1 |
| 987,807 A | * | 3/1911 | Lonskey | H02G 3/06 285/179.1 |
| 1,081,633 A | * | 12/1913 | Smith | F16L 5/00 285/129.2 |
| 1,459,585 A | * | 6/1923 | Felton | E03C 1/122 285/132.1 |

(Continued)

*Primary Examiner* — David Bochna
(74) *Attorney, Agent, or Firm* — Rankin, Hill & Clark LLP

(57) ABSTRACT

A pipe fitting includes an entry hub, an exit hub, and a cleanout hub. The cleanout hub is coaxially aligned with the exit hub and angularly offset from the entry hub. The pipe fitting also includes a main body that extends between the cleanout hub and the exit hub. The main body defines a main body length that is at least three times greater than the exit hub outer diameter.

2 Claims, 17 Drawing Sheets

(56) References Cited

U.S. PATENT DOCUMENTS

| | | | | |
|---|---|---|---|---|
| 1,629,208 A * | 5/1927 | Lot | E03C 1/122 | 138/37 |
| 1,759,803 A * | 5/1930 | Pysher | E03C 1/122 | 15/104.31 |
| 2,126,575 A * | 8/1938 | Leo | E03B 3/11 | 166/278 |
| 2,128,292 A * | 8/1938 | Finn | F16K 17/383 | 137/75 |
| 2,567,165 A * | 9/1951 | Buskirk | E03C 1/122 | 285/132.1 |
| 2,692,230 A * | 10/1954 | Hendon | C02F 3/28 | 210/538 |
| 2,756,076 A * | 7/1956 | Rodriguez, Jr. | E03C 1/122 | 285/4 |
| 2,911,235 A * | 11/1959 | Stumbough | E03C 1/122 | 285/93 |
| 2,944,669 A * | 7/1960 | Schaaf | E03F 5/14 | 210/121 |
| 3,014,222 A * | 12/1961 | Pope | E03D 11/143 | 248/295.11 |
| 3,338,254 A * | 8/1967 | Regal | F16L 5/02 | 137/68.13 |
| 3,709,527 A * | 1/1973 | Nations | F16L 17/025 | 285/110 |
| 3,771,968 A * | 11/1973 | Stalnaker | B01F 1/0027 | 422/275 |
| 3,825,286 A * | 7/1974 | Henry, III | F15D 1/04 | 285/132.1 |
| 3,826,376 A * | 7/1974 | Carlson | B01D 21/0042 | 210/519 |
| 4,031,914 A * | 6/1977 | Neri | E03C 1/284 | 137/247.51 |
| 4,363,732 A * | 12/1982 | Crates | C02F 1/006 | 210/532.2 |
| 4,371,991 A * | 2/1983 | Schrott | E03C 1/30 | 137/247.51 |
| 4,681,684 A * | 7/1987 | Maroschak | E03F 11/00 | 210/532.2 |
| 4,724,858 A * | 2/1988 | Cornwall | F16L 5/04 | 137/362 |
| 4,788,800 A * | 12/1988 | Whiteley | F16L 5/04 | 52/1 |
| 4,811,431 A * | 3/1989 | Kraverath | E03C 1/12 | 285/138.1 |
| 5,016,923 A * | 5/1991 | Adamaitis | E03C 1/122 | 285/179 |
| 5,127,425 A * | 7/1992 | Cornwall | A62C 2/06 | 137/1 |
| 5,183,070 A * | 2/1993 | Cornwall | A62C 2/06 | 137/362 |
| 5,234,018 A * | 8/1993 | Grachal | E03C 1/122 | 137/244 |
| 5,282,456 A * | 2/1994 | Smelcer | F23L 17/04 | 126/11 OR |
| 5,342,144 A * | 8/1994 | McCarthy | E03F 1/00 | 405/36 |
| 5,344,193 A * | 9/1994 | Rio | F16L 35/00 | 137/312 |
| 5,425,600 A * | 6/1995 | Gordon | E02D 29/025 | 405/125 |
| 5,427,679 A * | 6/1995 | Daniels | B01D 29/23 | 210/170.08 |
| 5,683,577 A * | 11/1997 | Nurse, Jr. | B01D 29/33 | 210/170.01 |
| 6,074,130 A * | 6/2000 | Duran | E02D 29/12 | 285/179.1 |
| 6,136,190 A * | 10/2000 | Zoeller | B01D 29/15 | 210/299 |
| 6,231,762 B1 * | 5/2001 | Marshall, III | B01D 29/33 | 210/234 |
| 6,319,403 B1 * | 11/2001 | Meyers | B01D 35/027 | 210/336 |
| 6,422,608 B1 * | 7/2002 | Lee | B65G 53/523 | 285/131.1 |
| 7,438,326 B1 * | 10/2008 | Meyers | F16L 41/021 | 285/133.11 |
| 7,857,968 B2 * | 12/2010 | Connelly | B01D 21/0006 | 210/170.08 |
| D659,809 S * | 5/2012 | Smith | D23/268 | |
| D675,290 S | 1/2013 | Mitchell | | |
| D676,533 S | 2/2013 | Clarke | | |
| 8,939,471 B2 * | 1/2015 | Hawboldt | F16L 51/00 | 285/132.1 |
| 9,103,560 B2 * | 8/2015 | Dempsey | F24H 3/025 | |
| 9,233,323 B1 | 1/2016 | Gavin | B01D 35/0276 | |
| 2014/0041463 A1 * | 2/2014 | Vethe | E21B 41/04 | 73/863.51 |
| 2015/0275490 A1 * | 10/2015 | Letcher, Jr. | E03C 1/30 | 4/255.01 |
| 2019/0112795 A1 * | 4/2019 | Keohane | F16L 45/00 | |

\* cited by examiner

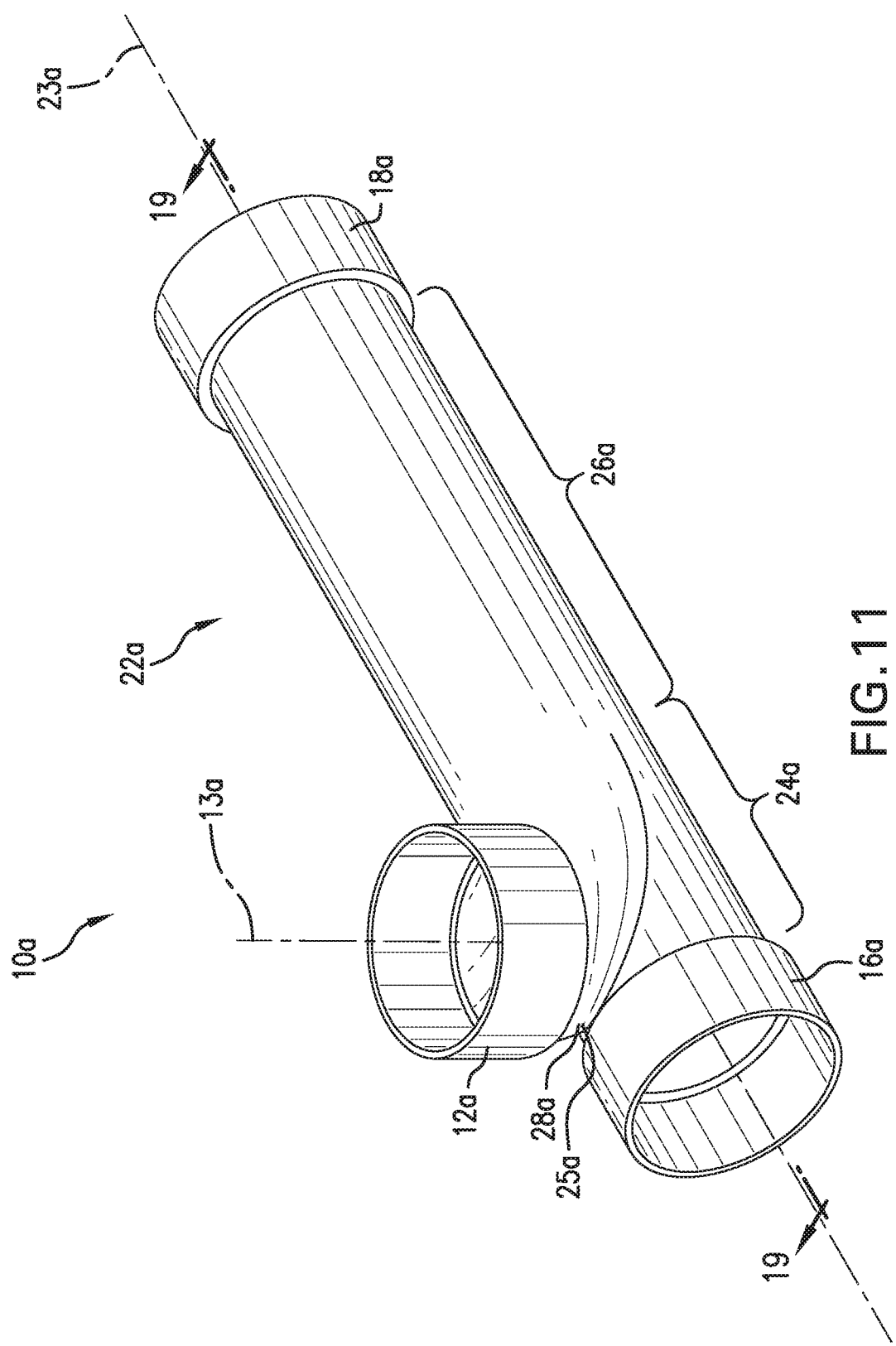

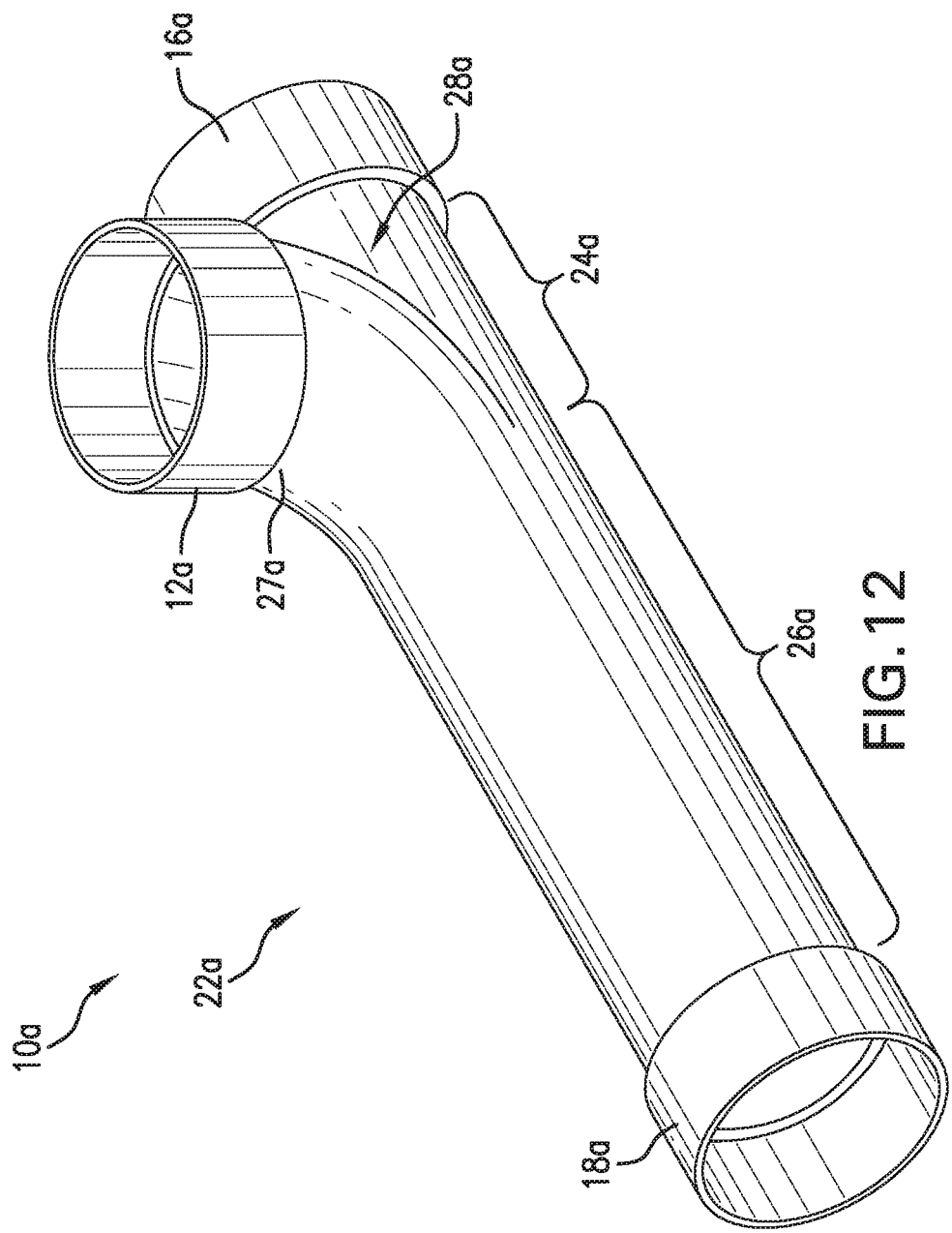

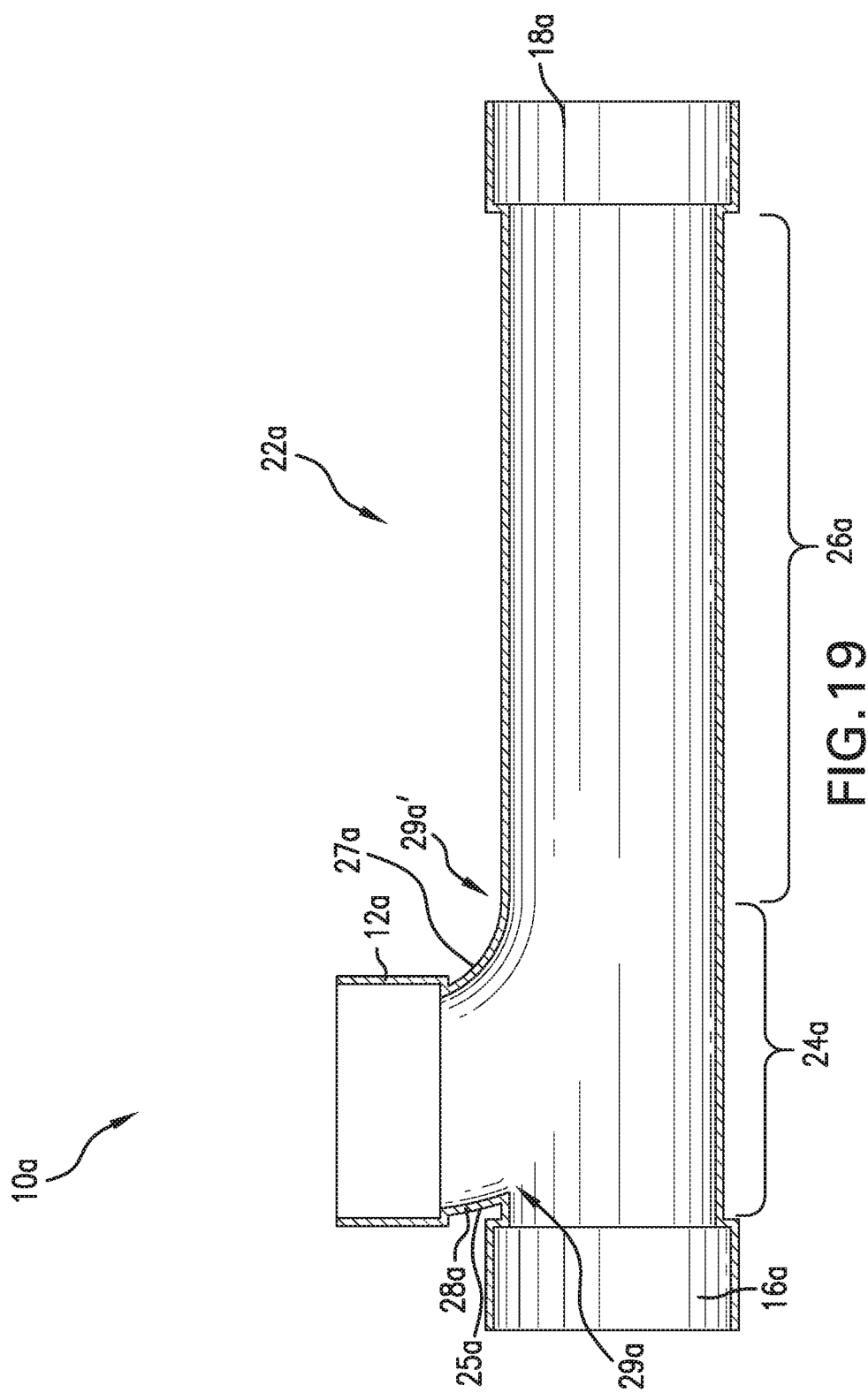

PIPE FITTING

BACKGROUND

The present invention relates generally to the field of piping systems, and more particularly, to an improved pipe fitting.

Piping systems include a plurality of pipes and pipe fittings. A pipe is a tubular section or hollow cylinder that may be of a circular cross-section and is used to convey substances which can flow (e.g., liquids, gases, slurries, powders and masses of small solids). A pipe fitting is used to connect straight pipe or to adapt to different sizes or shapes. A pipe fitting can also be used for other purposes, such as regulating or measuring fluid flow, changing direction of the piping system, and providing an access point to within the piping system for cleaning or maintenance purposes.

These pipes and fittings are utilized to contain storm water, grey water and/or raw sewage (hereinafter 'fluid'). With the aid or gravity and/or pressure enhancement techniques (e.g., pumps), the fluid subsequently travels within the piping system to either a septic tank or sewage system (hereinafter 'sewer'). The pipes and fittings can receive the fluid from a variety of sources, including for example, sinks, toilets, showers, and bath tubs (hereinafter 'device').

The piping system includes two regions, an interior region and an exterior region. The interior region of the piping system is located within a house or building (hereinafter 'structure'), whereas the exterior region is located outside of the structure. In many structures, the piping system is situated so that an ending portion of the interior region of the system is in a basement or a below grade portion of the structure.

Traditionally, a wye or tee pipe fitting (hereinafter 'pipe fitting') is placed at least partially within an exterior wall of the structure. Also many times, the exterior wall is made of concrete block, also known as a concrete masonry unit (CMU), concrete brick, cement block, besser block, breeze block, and cinder block. The concrete block is a large rectangular brick used in construction and can include at least one hollow portion.

Therefore, the connection point or joint, between the pipe fitting and the pipe that leads to the sewer is located within the exterior wall, specifically within the hollow portion of the concrete block. Many times, if there is a failure in the connection between the pipe that leads to the sewer and the pipe fitting, a leak can occur. As the pipe fitting is located within the exterior wall, there is the potential for the fluid to leak within the exterior wall. Further, this leakage may not be readily apparent. Thus, the leak may occur for an extended period of time, thereby increasing the potential costs for subsequent clean-up. Accordingly, an improved pipe fitting is needed.

SUMMARY

In view of the foregoing, according to one aspect a pipe fitting for fluid is provided. The pipe fitting includes an entry hub that defines an entry point for the fluid into the pipe fitting. The entry hub defines an entry hub outer diameter and an entry hub axis. The pipe fitting also includes an exit hub that defines an exit point for the fluid from the pipe fitting. The exit hub defines an exit hub outer diameter and an exit hub axis. The exit hub is offset from the entry hub such that the exit hub axis and the entry hub axis are angularly offset from one another. The pipe fitting also includes a cleanout hub that is coaxially aligned with the exit hub and angularly offset from the entry hub, and a main body that extends between the cleanout hub and the exit hub. The main body defines a main body length that is at least three times greater than the exit hub outer diameter.

According to another aspect, a pipe fitting for fluid is provided. The pipe fitting includes an entry hub defining an entry point for the fluid into the pipe fitting, an exit hub defining an exit point for the fluid from the pipe fitting, a cleanout hub that is coaxially aligned with the exit hub and angularly offset from the entry hub, a main body extending between the cleanout hub and the exit hub, and a branch extending between the entry hub and the main body. A distance along the main body between the exit hub and the branch is at least ten times greater than a distance along the main body between the cleanout hub and the branch.

According to another aspect, a method of installing a pipe fitting in a wall includes the step of providing a pipe fitting including an entry hub that defines an entry point for the pipe fitting, an exit hub that defines an exit point for the pipe fitting, a cleanout hub that is coaxially aligned with the exit hub and angularly offset from the entry hub, and a main body extending between the cleanout hub and the exit hub. The method also includes the step of locating the pipe fitting such that the wall is completely between the entry hub and the exit hub.

BRIEF DESCRIPTION OF THE DRAWINGS

FIG. 11 is a front perspective view of a sanitary T pipe fitting;
FIG. 12 is a rear perspective view thereof;
FIG. 19 is a front sectional view thereof along line 19-19 of FIG. 11.

DETAILED DESCRIPTION

Figure 1:
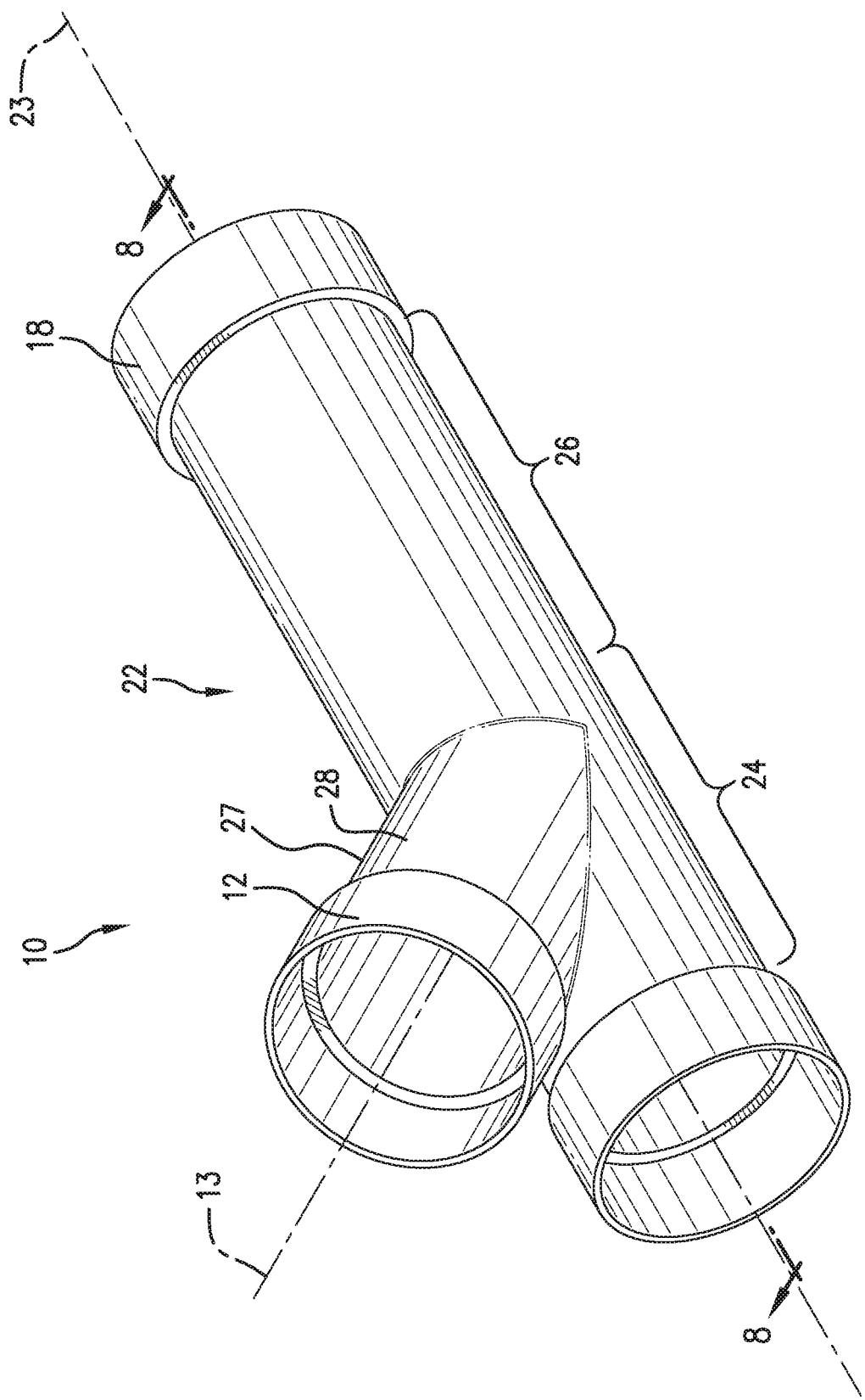
FIG. 1 is a front perspective view of a wye pipe fitting.
Figure 2:
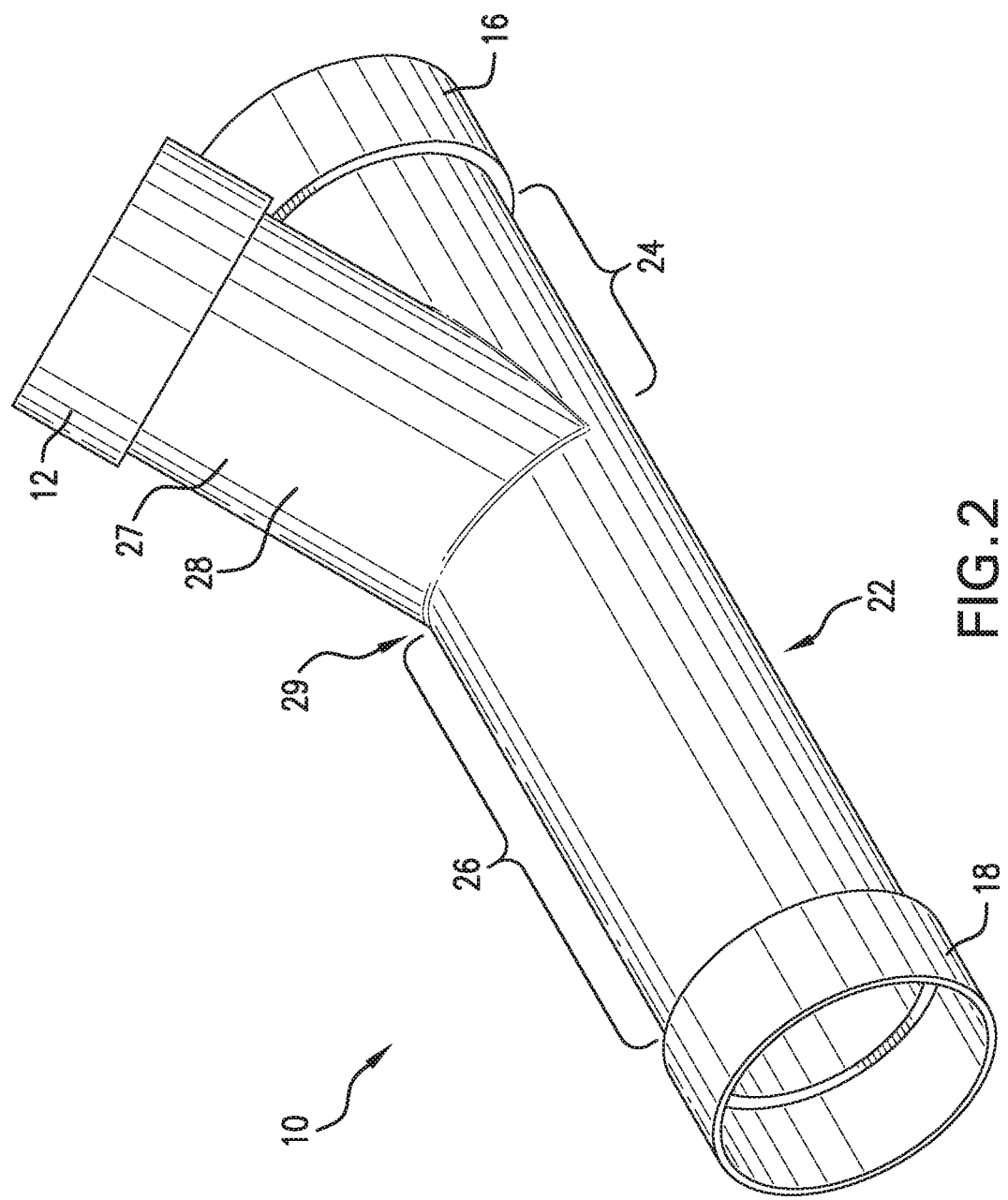
FIG. 2 is a rear perspective view thereof.
Figure 3:
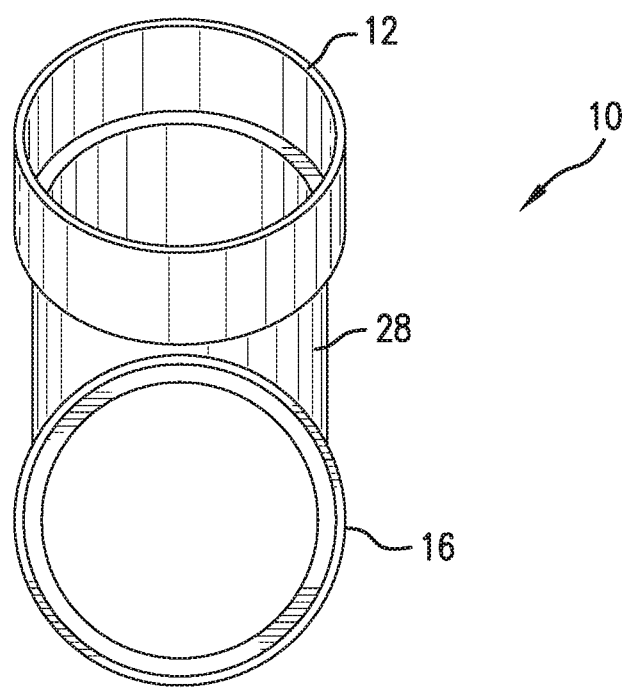
FIG. 3 is a left side elevation view thereof.
Figure 4:
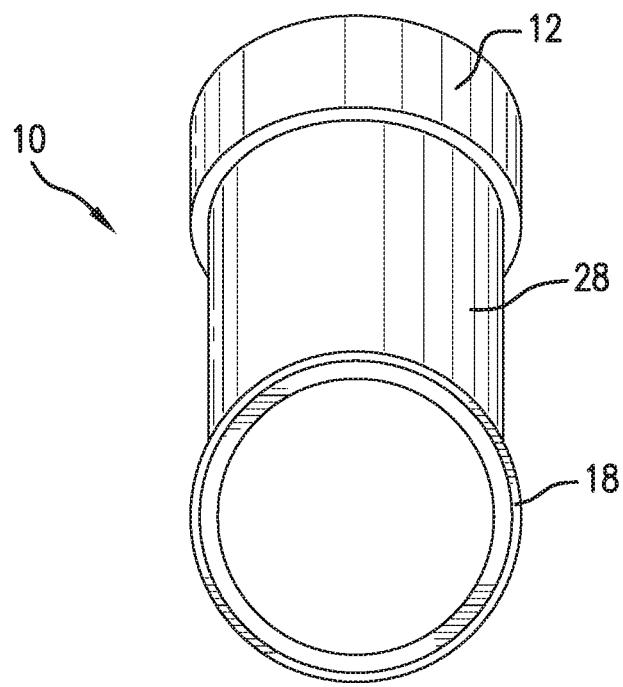
FIG. 4 is a right side elevation view thereof.

With reference to the figures, a pipe fitting 10,10*a* is shown. The pipe fitting 10, 10*a* could be made with any number of materials by any number of known manufacturing methods without departing from the scope of the disclosure. For example, the pipe fitting could be made of ABS (acrylonitrile butadiene styrene), PVC (polyvinyl chloride), UPVC (unplasticized polyvinyl chloride), CPVC (post chlorinated polyvinyl chloride), or ductile iron. Further, the pipe fitting 10 could be manufactured by injection molding, extrusion, casting, and 3-D printing.

Initially, it is noted that reference numerals 10 and 10*a* are used interchangeably to indicate a pipe fitting. Notably, reference numeral 10 refers to a wye pipe fitting and reference numeral 10*a* refers to a sanitary T pipe fitting. Further, unless otherwise noted, descriptions related to portions of the pipe fitting 10, are identical to the similarly named and numbered portions of the pipe fitting 10*a*. For example, as will be detailed hereinbelow, the wye pipe fitting 10 includes an exit hub 18 and the sanitary T pipe fitting 10*a* includes an exit hub 18*a*. Both of the exit hubs 18, 18*a* are identical in all aspects.

The pipe fitting 10 includes an entry hub 12, a cleanout hub 16, and an exit hub 18. The entry hub 12 can be for the receipt of a supply pipe 14 that is connected to a device which supplies fluid. As shown in the figures, entering fluid 15 enters the pipe fitting 10 through the entry hub 12 so as to define an entry point for the fluid. The exit hub 18 can be connected to a discharge pipe 20 that extends to a sewer (not shown). Exiting fluid 21 exits the pipe fitting 10 through the exit hub 18 so as to define an exit point for the fluid. As will be appreciated, the pipe fitting 10 can be joined to the pipes 14, 20 by any number of known methods, including pipe cement/solvent and spin-welding.

The entry hub 12 defines an entry hub axis 13. The entry hub axis 13 is an imaginary axis that orthogonally extends through a center of a circular plane created by a cross-section of the entry hub 12. Further, the exit hub 18 defines an entry hub axis 19. The exit hub axis 23 is an imaginary axis that orthogonally extends through a center of a circular plane created by a cross-section of the exit hub 18. The exit hub 18 is offset from the entry hub 12 such that the exit hub axis 23 and the entry hub axis 13 are angularly offset from one another. This offset helps ensure that the fluid entering the fitting 10 flows in the proper direction and in accordance with known and preferred plumbing principles.

Further, the entry hub 12 defines an entry hub outer diameter and the exit hub 18 defines an exit hub diameter. It will be appreciated that the entry hub diameter and the exit hub diameter can be equal. This sizing ensures that fluid maintains a proper speed when traveling through the fitting 10.

The cleanout hub 16 can be used as an access point to within the pipe fitting 10 for maintenance purposes (i.e., drain cleaning or insertion of inspection cameras) and be removably sealed with a threaded plug or cover (not shown). As will be appreciated, fluid is not introduced into the pipe fitting 10 though the cleanout hub 16 during normal operation of the pipe fitting 10. The cleanout hub 16 is coaxially aligned with the exit hub 18 and angularly offset from the entry hub 12. Thus, exit hub axis 23 extends through a center of the cleanout hub 16 and the entry hub axis 13 does not intersect with the cleanout hub 16. The entry hub 12, the cleanout hub 16, and the exit hub 18 are in fluid communication with one another. Further, the entry hub 12, the cleanout hub 16, and the exit hub 18 can all have a same cross-sectional shape and can share a same dimensional outer dimensional size. As illustrated, this is a circular shape. The same cross-sectional shape and size between the hubs 12, 16, 18 ensures uniform fluid flow in the fitting 10.

With continued reference to the figures, the pipe fitting 10 also includes a main body 22 that extends between the cleanout hub 16 and the exit hub 18. The main body 22 defines a main body length that is at least three times greater than any of the exit hub outer diameter, the entry hub outer diameter and the outer diameter of the cleanout hub 16.

Further, the pipe fitting 10 also includes a branch 28 that extends between the entry hub 12 and the main body 22. The branch 28 may be coaxially aligned with the entry hub axis 13. The branch 28 can include a cleanout face 25 that faces the cleanout hub 16 and an exit face 27 that faces the exit hub 18. The cleanout face 25 and the exit face 27 face in opposite directions with respect to one another.

Figure 5:
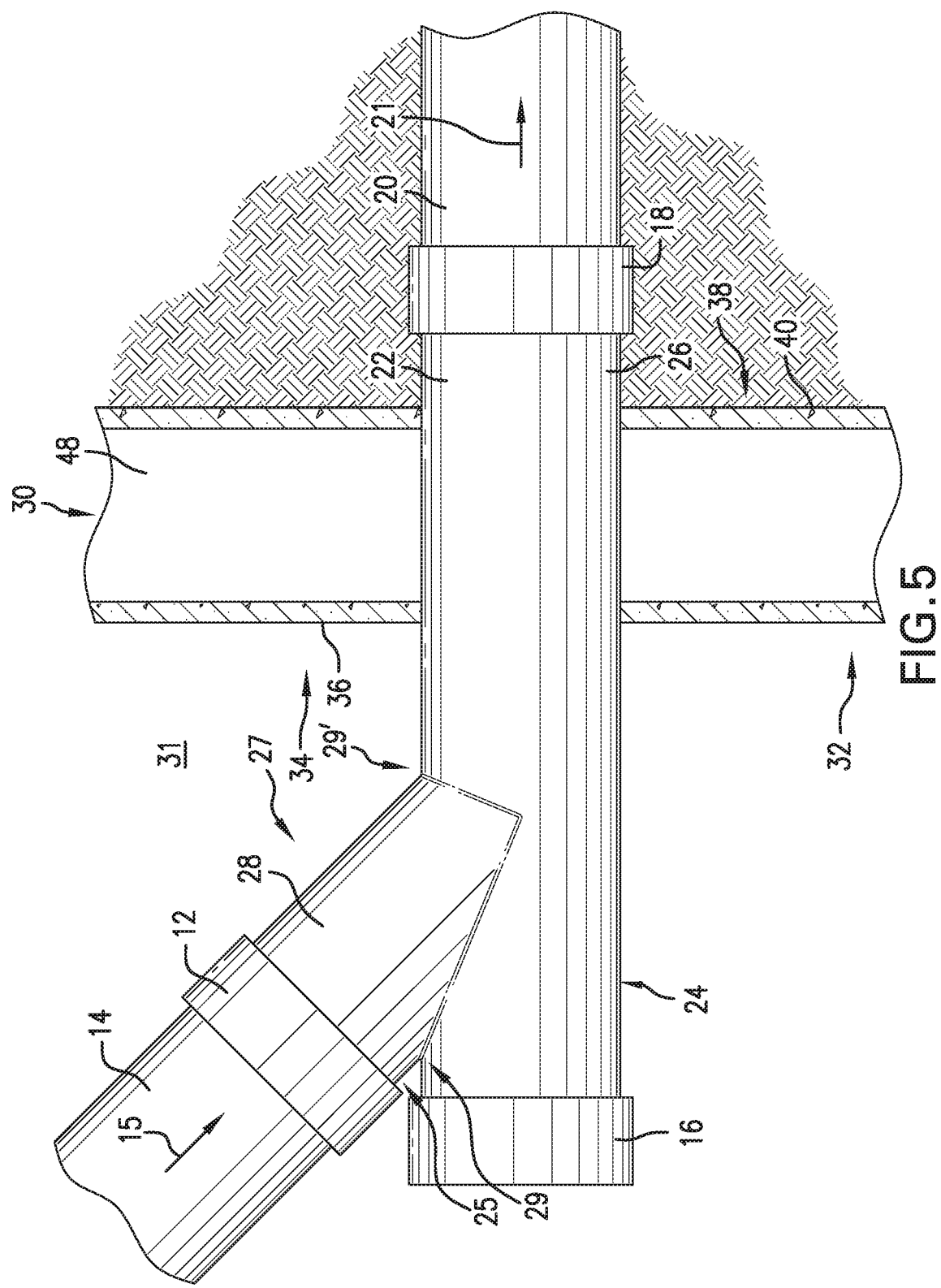
FIG. 5 is a front elevation view of the pipe fitting installed in a structure.
Figure 6:
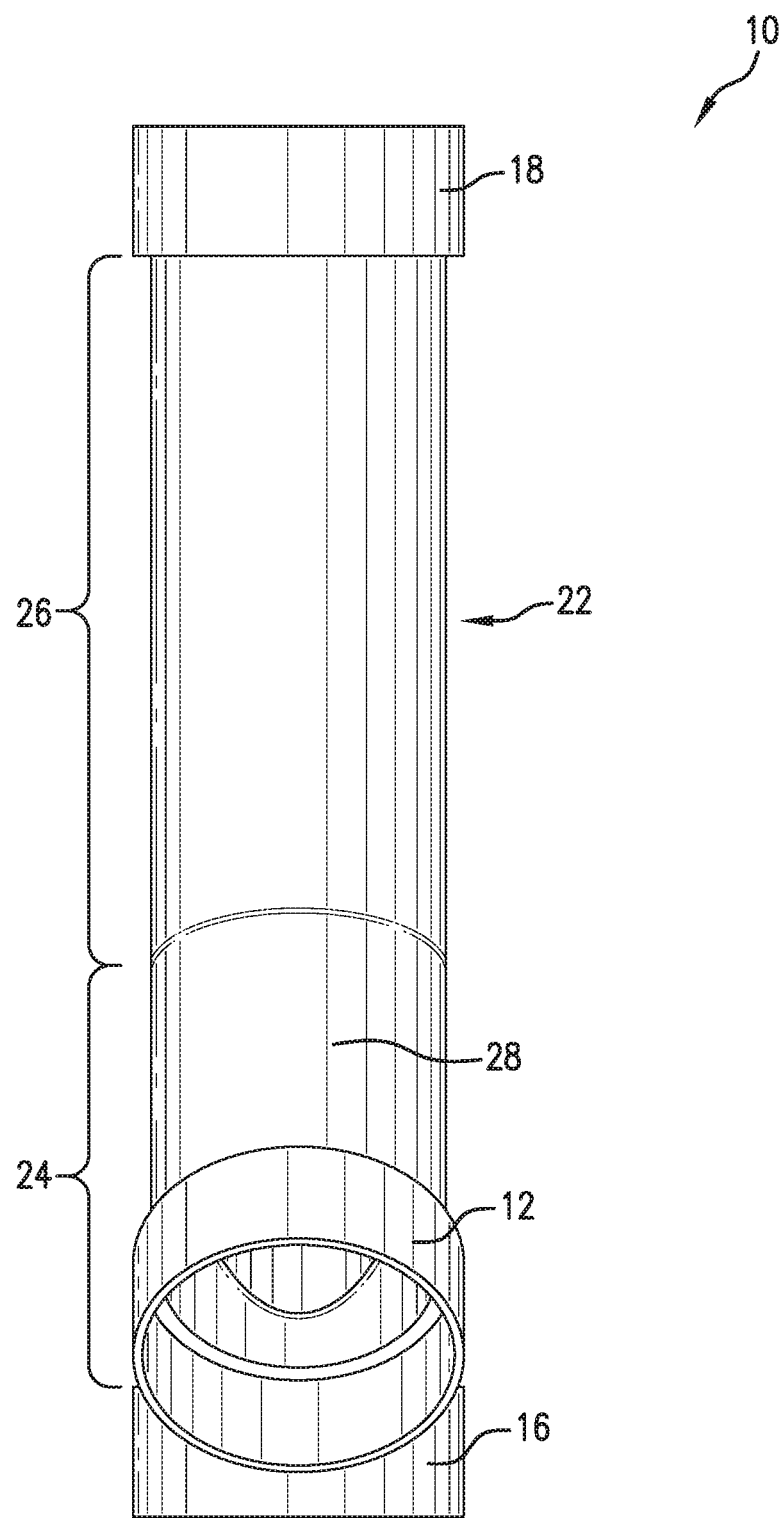
FIG. 6 is a top plan view thereof.
Figure 7:
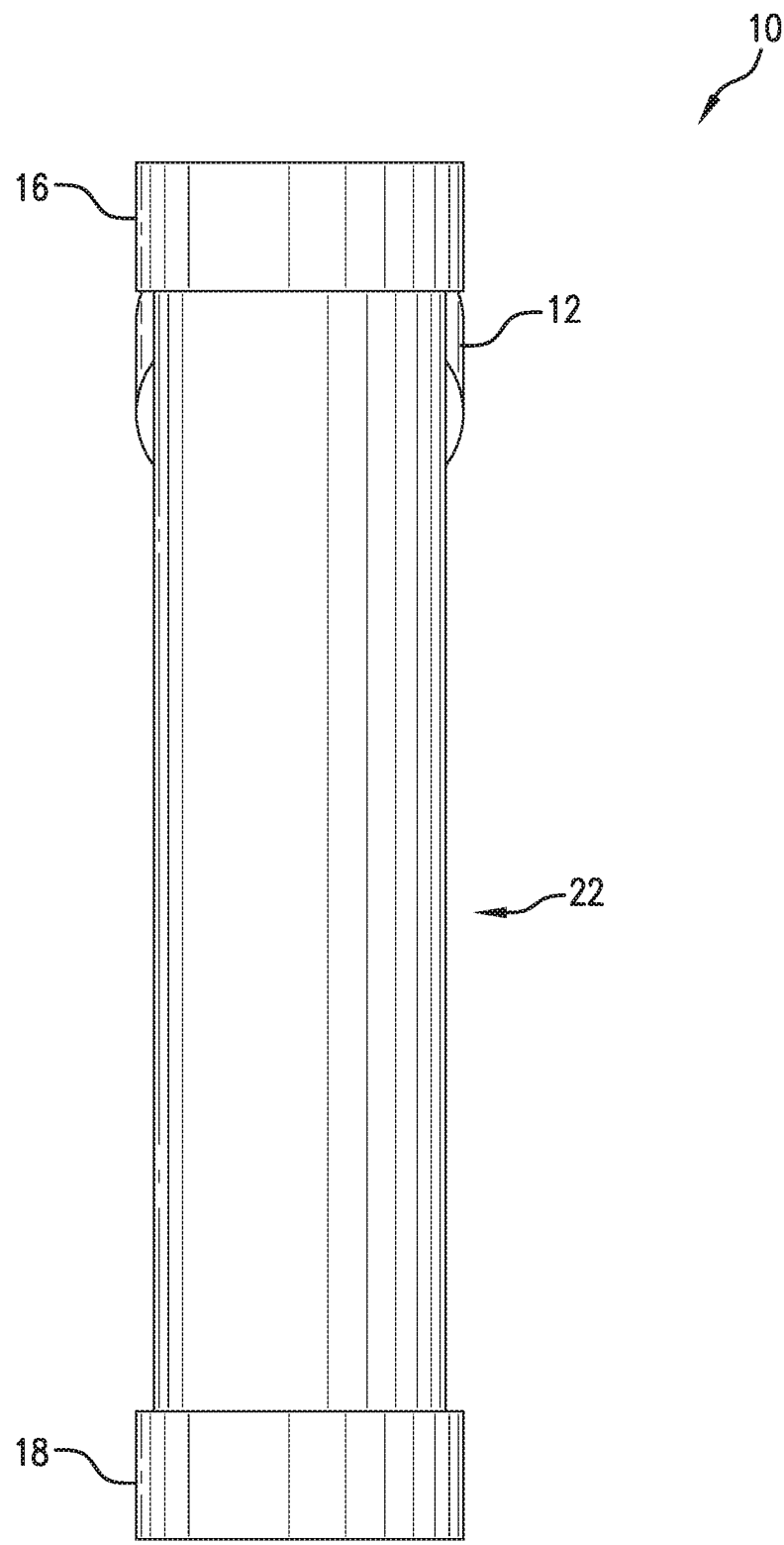
FIG. 7 is a bottom plan view thereof.
Figure 8:
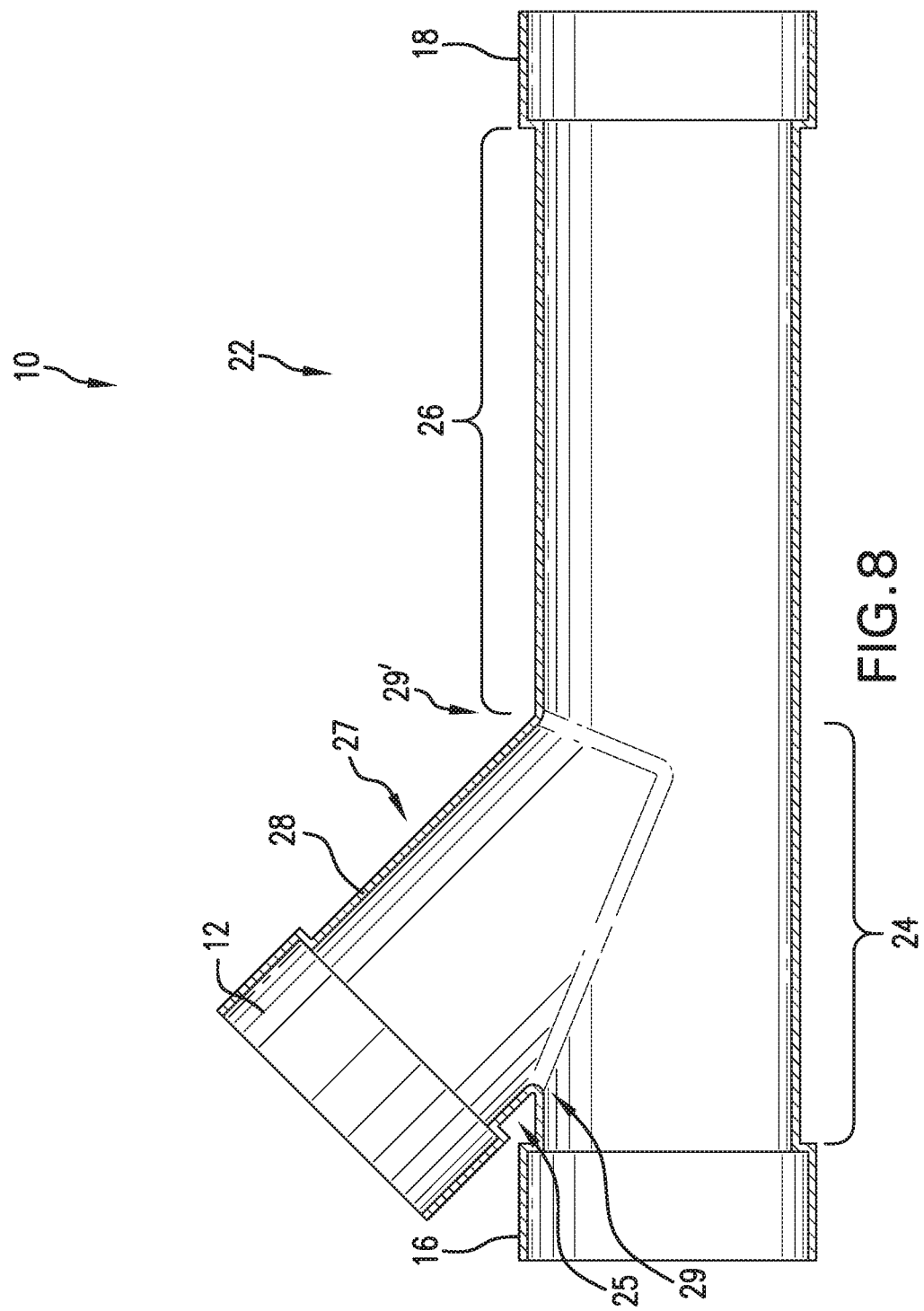
FIG. 8 is a front sectional view thereof along line 8-8 of FIG. 1.

As shown in FIG. 5, the branch 28, and hence the entry hub 12, is angularly offset from the cleanout hub 16 and a first portion 24 of the main body 22 by an acute angle. More particularly, a cleanout side junction 29, which is defined by the angle formed between the cleanout face 25 of the branch 28 and the main body 22, may be an angle of approximately 45 degrees in an elevation view of the pipe fitting 10. Further, an exit side junction 29', which is defined by the angle formed between the exit face 27 of the branch 28 and the main body 22, may be an angle of approximately 135 degrees in an elevation view of the pipe fitting. A distance along the main body 22 from the exit hub 18 to the exit side junction 29' is at least 1.5 times greater than a distance along the exit face 27 of the branch 28 from the entry hub 12 to the exit side junction 29'. Due to this difference in size between the branch 28 and the main body 22, the pipe fitting 10 has a beneficial shape that permits the exit hub 18 to be located exterior to a structure.

A distance along the main body 22 between the exit hub 18 and where the branch 28 joins the main body 22 (i.e., exit side junction 29') is at least ten times greater than a distance along the main body 22 between the cleanout hub 16 and where the branch 28 joins the main body 22 (i.e., cleanout side junction 29). Because of this disparity in sizes as noted above, the pipe fitting 10 has a unique shape which allows the exit hub 18 to be located exterior to a structure as will be described hereinafter.

The main body 22 defines an outer diameter that is smaller than an inner diameter of either the entry hub 12 or the exit hub 18. The outer diameter of the main body 22 can also be less than the inner diameter of the entry hub 12 or the exit hub 18. Further, it will be appreciated that the hubs 16, 18 could be integral with the main body 22.

The main body 22 includes a first portion 24 and a second portion 26. The first portion 24 of the main body 22 extends from the cleanout hub 16 to the point at which the branch 28 joins the main body 22 (i.e., exit side junction 29') so as to define a first portion length. The second portion 26 extends from the point at which the branch 28 joins the main body 22 (i.e., exit side junction 29') to the exit hub 18 such that the branch 28 is entirely received by the first portion 24 so as to define a second portion length.

A sum of the length of the first portion 24 and the length of the second portion 26 is equal to an overall length of the main body 22 extending along the exit hub axis 23. The first portion 24 and the second portion 26 are angularly aligned along the exit hub axis 23. As illustrated, the second portion 26 is at least 33% longer than the first portion 24. Because of the above described layout and sizing, the pipe fitting 10 has a distinctive shape which allows the exit hub 18 and the accompanying joint to the discharge pipe 20 to be located exterior to a structure as will be detailed later.

The second portion 26 maintains a constant and continuous inner and outer diameter along an entire length thereof. This continuity of the second portion 26 of the main body 22 of the pipe fitting 10 minimizes a likelihood of leakage of fluid to an area outside of the fitting 10. As such, merely attaching additional sections of pipe or fittings onto a traditional pipe fitting will not achieve the same result. Rather, increased costs, increased weight, and increased possible leakage points would result. As is considered apparent, assembling these additional sections at the structure site would result in increased labor costs.

The branch 28 extends between the entry hub 12 and the first portion 24 of the main body 22. It will be appreciated that the entry hub 12 could be integral with the branch 28. Further, it will also be appreciated that the branch 28 could be integral with the main body 22. The branch 28 transmits the fluid received through the entry hub 12 into the main body 22. The branch 28 can have a same inner diameter and outer diameter as the main body 22. The outer diameter of the branch 28 is less than the inner diameter of the entry hub 12. The first portion 24 extends from the cleanout hub 16 toward the second portion 26. Further, the second portion 26 extends from the exit hub 18 toward the first portion 24 such that the branch 28 is entirely received by the first portion 24.

The second portion 26 of the main body 22 defines a length that is at least three times greater than the exit hub outer diameter. With this ratio, it is ensured that the second portion 26 of the main body 22 will be of sufficient length so that the connection between the pipe fitting 10 and the discharge pipe 20 will not be within an exterior wall 30 of the structure. As illustrated, the second portion 26 has a greater length than the first portion 24. It is noted that all references to the fitting 10 relate to a fitting that is the final fitting/interface between interior region and exterior region of the piping system in the structure.

As shown in FIG. 5, the length of second portion 26 of the main body 22 ensures that the pipe fitting 10 extends between the entry hub 12 and the exit hub 18 such that exit hub 18 is located exterior to an exterior wall 30 of the structure (i.e., in the dirt or earthen material which houses the structure). As such, the exterior wall 30 defines a boundary between the dirt or earthen material and an interior space of the structure. Thus, the pipe fitting 10 is located such that the exit hub 18 is not located or disposed in the exterior wall 30. Rather, the exterior wall 30 is completely between the entry hub 12 and the exit hub 18 in a plan or side elevation view. As described by one of ordinary skill in the art, the pipe fitting 10 is located such that the exit hub 18 outside of the wall and runs wild.

With reference to FIG. 5, the exterior wall 30 can be made of a series of concrete blocks 32 that are bonded to one another with mortar or other suitable adhesives in rows, also known as courses. The block 32 has a first side 34 which defines a first face 36 and a second side 38 which defines a second face 40. The first face 36 faces in a direction opposite of the second face 40. More particularly, the second face 40 faces toward the dirt or earthen material, whereas the first face 36 faces the interior space of the structure.

Figure 10:
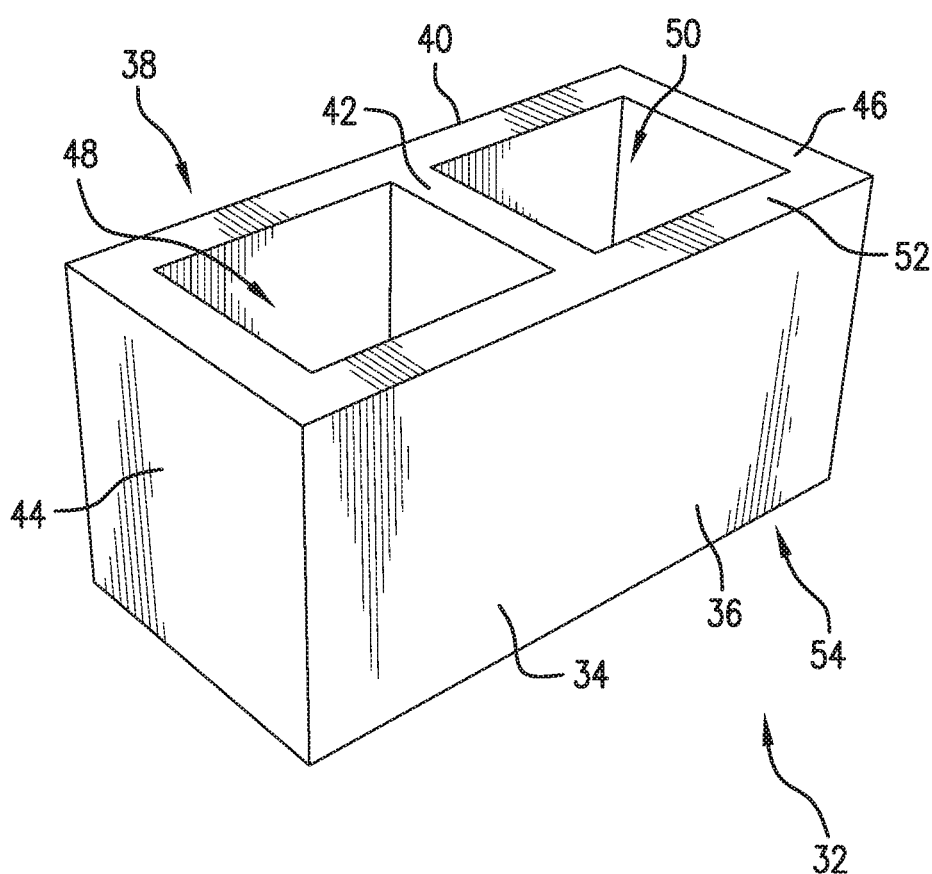
FIG. 10 is a perspective view of a concrete block.
Figure 14:
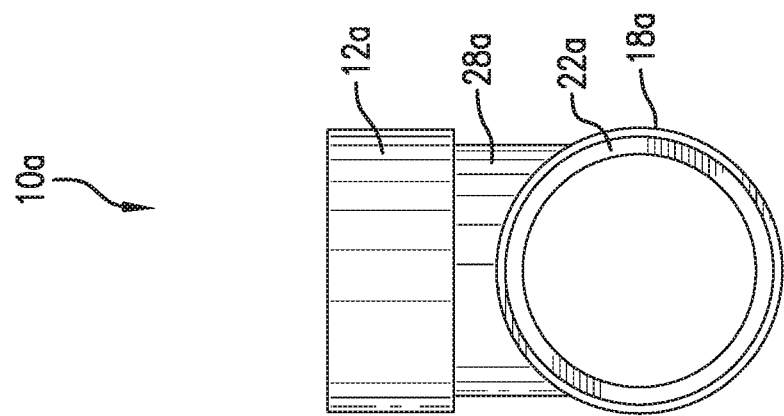
FIG. 14 is a right side elevation view thereof.
Figure 13:
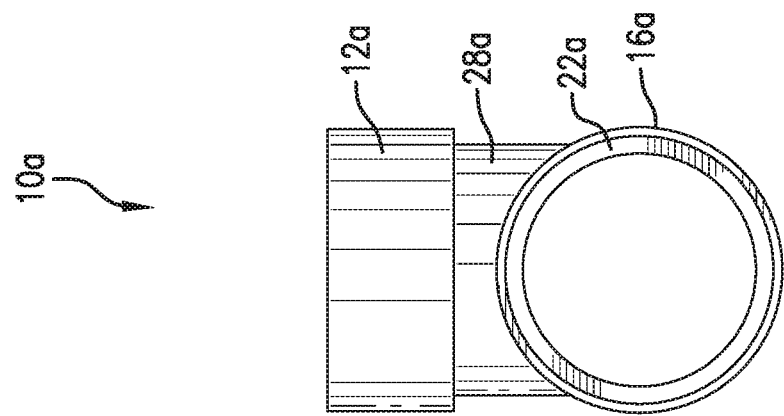
FIG. 13 is a left side elevation view thereof.
Figure 15:
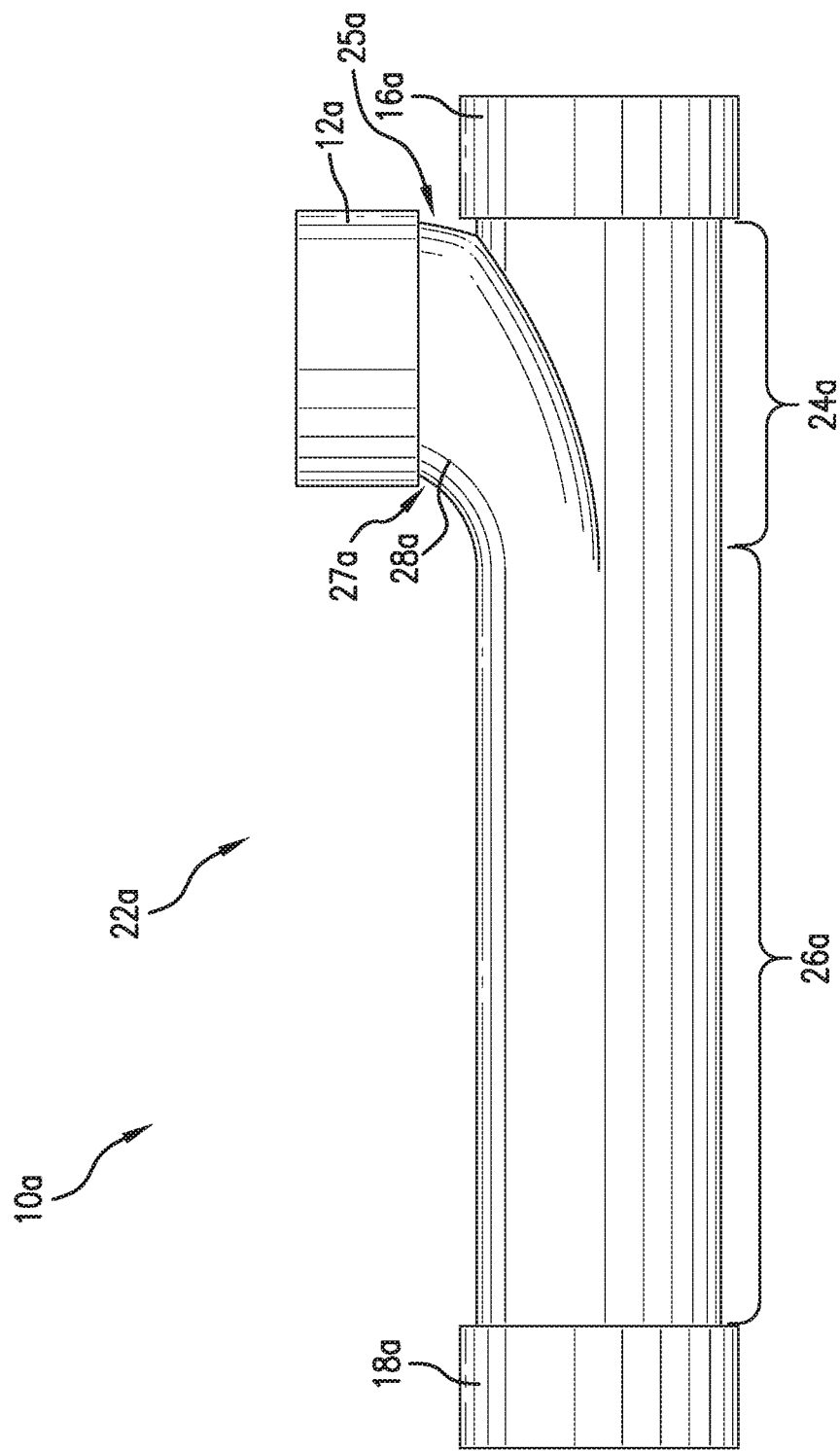
FIG. 15 is a rear elevation view thereof.

With reference to FIG. 10, a single concrete block 32 is shown. The concrete block 32 includes a connecting wall 42, a first end wall 44, and a second end wall 46 each extend between the first side 34 and the second side 38, so as to define a first hollow portion 48 and a second hollow portion 50. The concrete block 32 also includes a top face 52 and a bottom face 54. It will be appreciated that when the exterior wall 30 is created, that it is made of several courses so that the top faces of individual concrete blocks are connected to the bottom faces of other concrete blocks. Further, portions of the first end walls of individual concrete blocks will contact portions of the second end walls of other concrete blocks.

Figure 9:
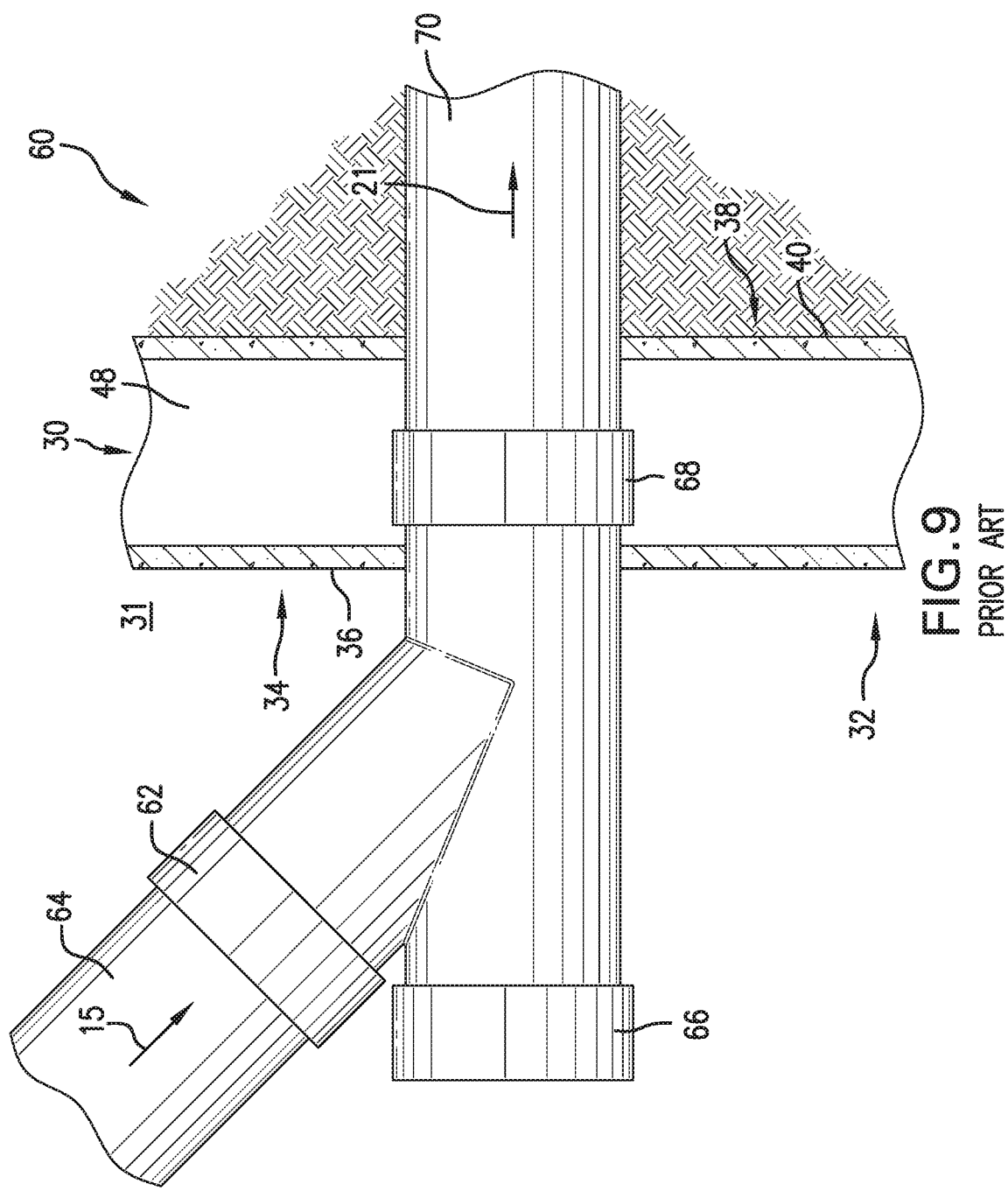
FIG. 9 is a front elevation view of a prior art pipe fitting installed in a structure.

As is shown in FIG. 9, a traditional pipe fitting 60 is shown. The traditional pipe fitting 60 includes an entry hub 62 which is attached to a pipe 64 from a device. The traditional pipe fitting 60 also includes a cleanout hub 66 and an exit hub 68. The exit hub 68 is attached to the discharge pipe 70 such that the connection between the components is located within the exterior wall 30. With this type of arrangement, any leakage of fluid from the traditional pipe fitting 60, which does not enter into the discharge pipe 70, has the potential to enter either the first or second hollow portion 48, 50 of the block 32 of the exterior wall 30. Thus, the block 32 becomes contaminated with raw sewage. Nevertheless, as the block 32 is used for providing support for the structure, the block 32 may not be easily removed.

With reference to FIGS. 11-19, a pipe fitting 10a is shown. As indicated hereinbefore, pipe fitting 10 is a wye pipe fitting, whereas pipe fitting 10a is a sanitary T pipe fitting. Unless otherwise noted, the descriptions related to portions of the pipe fitting 10, are identical to the portions of the pipe fitting 10a.

Figure 16:
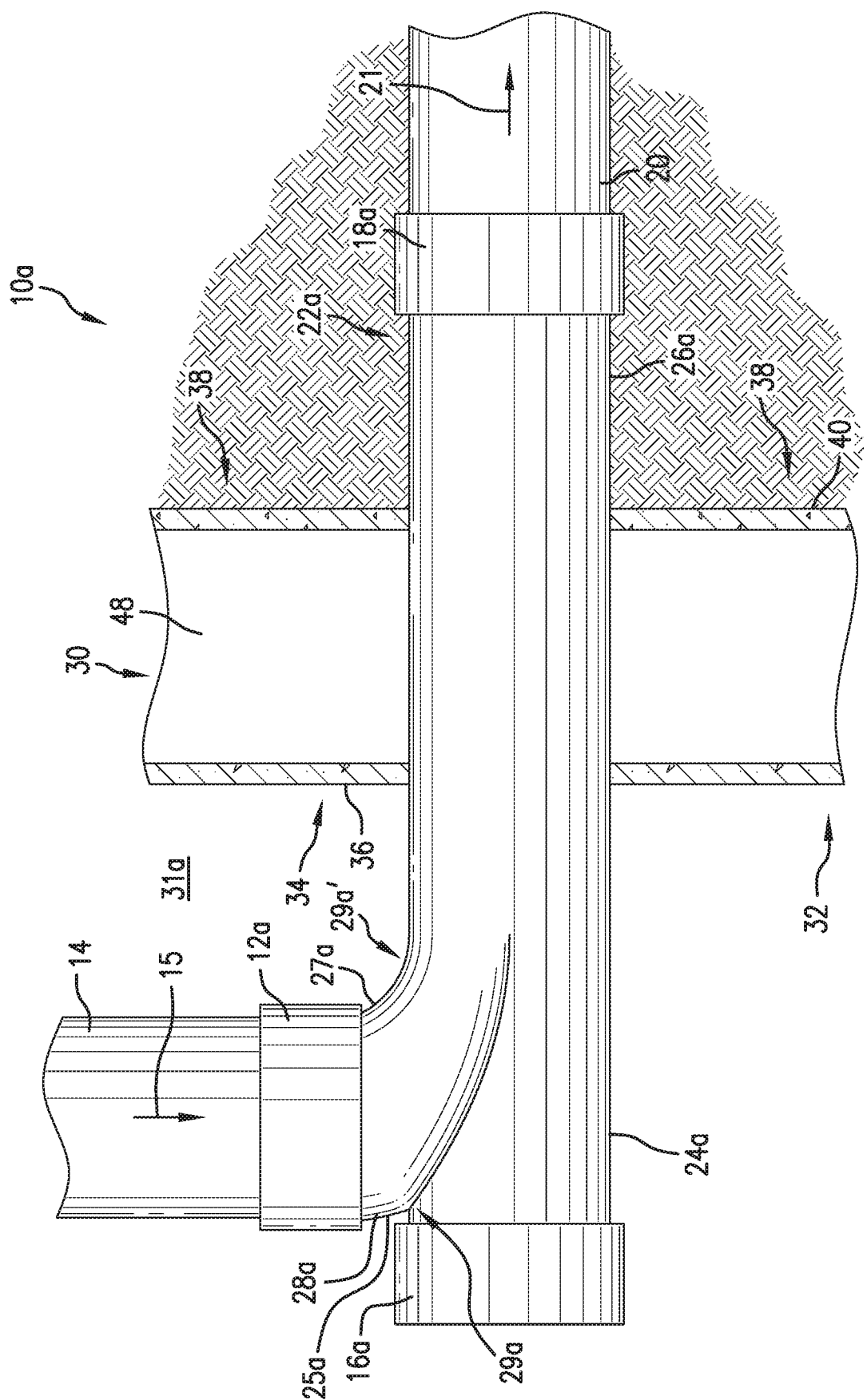
FIG. 16 is a front elevation view of the pipe fitting of FIG. 11 installed in a structure.
Figure 17:
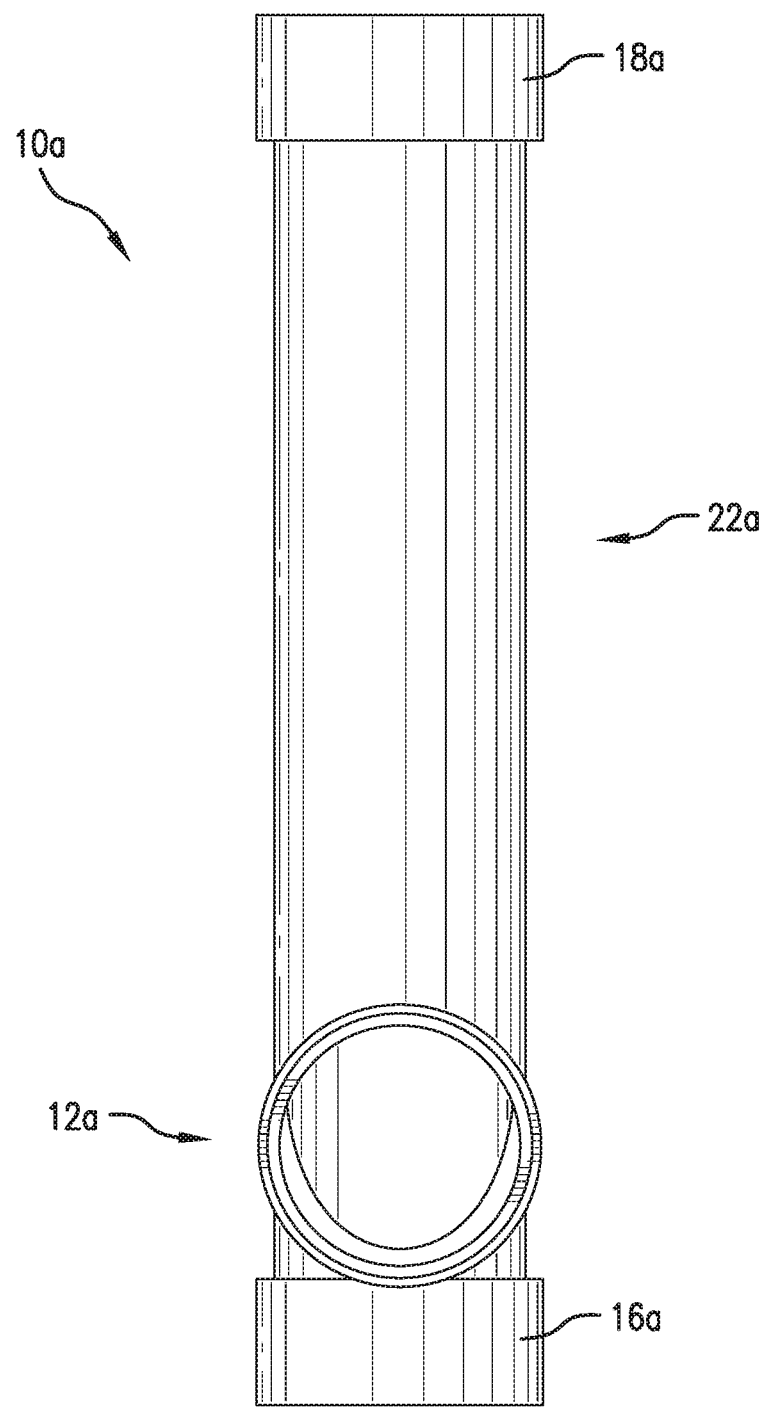
FIG. 17 is a top plan view thereof.
Figure 18:
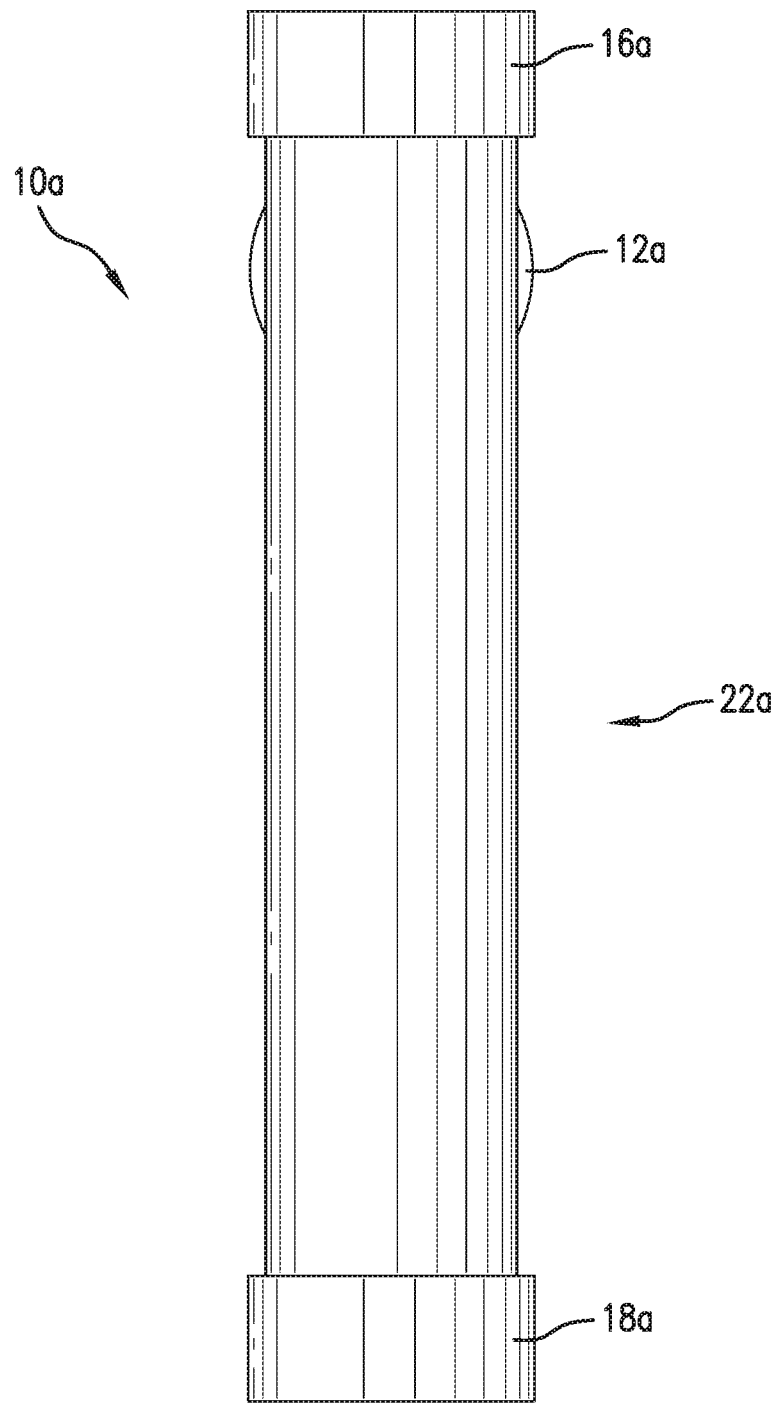
FIG. 18 is a bottom plan view thereof.

With reference to FIG. 16, the pipe fitting 10a includes the branch 28a. The branch 28a may be coaxially aligned with the entry hub axis 13a. The branch 28a can include a cleanout face 25a that faces the cleanout hub 16a and an exit face 27a that faces the exit hub 18a. The cleanout face 25a and the exit face 27a face in opposite directions with respect to one another.

As shown in FIG. 16, the branch 28a, and hence the entry hub 12a, is orthogonally offset from the cleanout hub 16a and the first portion 24a of the main body 22a. More particularly, a cleanout side junction 29a, which is defined by the angle formed between the cleanout face 25a of the branch 28a and the main body 22a, may be an angle of approximately 90 degrees in an elevation view of the pipe fitting 10a. Further, an exit side junction 29a', which is defined by the angle formed between the exit face 27a of the branch 28a and the main body 22a, may be an angle of approximately 90 degrees in an elevation view of the pipe fitting 10a.

A distance along the main body 22a from the exit hub 18a to the exit side junction 29a' is at least 1.5 times greater than a distance along the exit face 27a of the branch 28a from the entry hub 12a to the exit side junction 29a'. Accordingly, the pipe fitting 10a has a valuable shape that permits the exit hub 18a to be located exterior to the exterior wall 30 of the structure. It is also noted that while the branches 28, 28a have different angles that they are joined to the main body 22, 22a, the main bodies 22, 22a, and more particularly, the second portions 26, 26a are of sufficient length to allow the pipe fittings 10, 10a to be utilized such that the exit hubs 18, 18a are not installed in exterior walls 30.

A pipe fitting has been described above with particularity. Modifications and alterations will occur to those upon reading and understanding the preceding detailed description. The invention is not limited to only the embodiments described above. Instead, the invention is broadly defined by the appended claims and the equivalents thereof. It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of installing a pipe fitting in a vertical exterior wall, comprising the steps of:
   providing the pipe fitting including an entry hub that defines an entry point for fluid into the pipe fitting, an exit hub that defines an exit point for the fluid from the pipe fitting, a cleanout hub that is coaxially aligned with the exit hub and angularly offset from the entry hub, and a main body extending between the cleanout hub and the exit hub;

locating the pipe fitting such that the vertical wall is completely between the entry hub and the exit hub;

connecting the entry hub with a supply pipe; and connecting the exit hub to a discharge pipe that extends to a sewer.

2. The method of installing the pipe fitting of claim 1, wherein the exit hub is located to be completely exterior to the exterior vertical wall of a structure, and wherein the exterior vertical wall defines a boundary between dirt and an interior space of the structure.

* * * * *